United States Patent
Lyle et al.

(10) Patent No.: US 8,161,403 B2
(45) Date of Patent: Apr. 17, 2012

(54) RETURNING PASSED OBJECTS IN A SURFACE BASED COMPUTING ENVIRONMENT USING A VIRTUAL BUNGEE

(75) Inventors: Ruthie D. Lyle, Durham, NC (US); Ulysses Lamont Cannon, Durham, NC (US); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 11/951,002

(22) Filed: Dec. 5, 2007

(65) Prior Publication Data

US 2009/0150816 A1      Jun. 11, 2009

(51) Int. Cl.
*G06F 3/048* (2006.01)
(52) U.S. Cl. ........ 715/771; 715/733; 715/738; 715/748; 715/750; 715/863
(58) Field of Classification Search .................. 715/757, 715/750, 751, 753, 754, 755, 759, 758, 733, 715/738, 748, 863
See application file for complete search history.

(56) References Cited

U.S. PATENT DOCUMENTS

| | | | |
|---|---|---|---|
| 5,432,924 A | | 7/1995 | D'Souza et al. |
| 5,745,711 A | * | 4/1998 | Kitahara et al. .............. 715/759 |
| 6,054,989 A | * | 4/2000 | Robertson et al. ............ 715/848 |
| 6,313,853 B1 | * | 11/2001 | Lamontagne et al. ........ 715/762 |
| 6,347,313 B1 | | 2/2002 | Ma et al. |
| 6,445,400 B1 | * | 9/2002 | Maddalozzo et al. ........ 715/803 |
| 7,397,464 B1 | * | 7/2008 | Robbins et al. ................ 345/173 |
| 2007/0094596 A1 | * | 4/2007 | Nielsen et al. ................ 715/700 |

OTHER PUBLICATIONS

Del Bibmo, A., et al., "Content-based Retrieval of 3D Models", ACM Transactions on Multimedia Computing, Communications, and Applications, vol. 2, No. 1, pp. 20-43, Feb. 2006.

* cited by examiner

*Primary Examiner* — Andrey Belousov
(74) *Attorney, Agent, or Firm* — Patents on Demand, P.A.; Brian K. Buchheit; Scott M. Garrett

(57) ABSTRACT

The present invention discloses a solution for a surface based computing device to return passed objects. That is, software of the surface based computing device can permit software objects appearing within a display of a surface based computing device to be passed among users positioned about the surface based computing device. The surface based computing device can also include software maintaining linkages between passed software objects and return positions defined for each of the passed software objects. Further software can be configured to automatically return at least one of the passed software objects from a current position on the display to an associated return position responsive to an occurrence of a return object event relating to that passed software object. Visual representation of the linkages can be optionally shown on the surface based computing device and the passing objects can be optionally animated.

17 Claims, 4 Drawing Sheets

US 8,161,403 B2

RETURNING PASSED OBJECTS IN A SURFACE BASED COMPUTING ENVIRONMENT USING A VIRTUAL BUNGEE

BACKGROUND

1. Field of the Invention

The present invention relates to the field of surface based computing and, more particularly, to returning passed objects in a surface based computing environment using a virtual bungee.

2. Description of the Related Art

Surface based computing devices are a type of computing device in which a display is laid flat to simulate a table top. Surface based computing devices employ the use of a multi-touch sensitive display to interact with the user. Because of the nature of a surface based computing device's display, multiple users can interact with the computing device at once. Because the display provides multi-touch sensitivity, users can perform movements, such as gestures, on the display which are recognizable by the computing device to perform certain actions.

One such gesture can indicate that software objects displayed on the surface based computing device are to be passed from one user to another. One way of passing objects, for example, has been described in U.S. patent application Ser. No. 11/868,766, entitled "Sending a Document for Display to a User of a Surface Computer" and filed Oct. 8, 2007. This application describes a "fling" gesture, where a user can press down on an object on the display and then move their finger in a direction in a quick motion. A fling motion can be used on a document on a surface-based computing device. This motion can move the document in the direction it is flung. Other ways of passing software objects also exist. There is currently no way to temporarily pass an object, such that an owner is able to retrieve a previously passed object or to establish parameters for controlling a return of an object that has been passed, which would be advantageous in many surface based computing situations.

One example of a prior art surface based computing device is illustrated in FIG. 1 (Prior Art), which shows display surface 105, computing device 110, display projector 115, and infrared projectors 120. Processing unit 110 can contain one or more central processing units able to perform computing actions for the surface based device 100. The processing unit 110 can include many of the same components found in everyday desktop computers, such a CPU, a motherboard, RAM, a graphics card, a WIFI transceiver, a BLUETOOTH transceiver, and the like.

The display surface 105 can be a horizontal surface that can incorporate multi-touch sensors. The touch-sensitive display can recognize objects by their shapes or by scanning tags (e.g., RFID tags) embedded in objects resting on the surface of display surface 105. The multi-touch display surface 105 can be capable of processing multiple inputs from multiple users.

Infrared projectors 120 can project infrared light onto display surface 105 to be used for multiple touch sensing by processing unit 110. A "machine vision" of the surface based computing device 100 can operate in a near-infrared spectrum, such as by using an 850 nanometer-Wavelength LED light source aimed at the display surface 105. When objects touch the tabletop, the light reflects back and is picked up by multiple infrared cameras with an acceptable net resolution.

The display projector 115 can use rear-projection technologies, such as Digital light Processing (DLP) technologies, to project visible images to the display surface 105. A resolution of the visible screen can be different from the machine vision or invisible screen. For example, the visible screen can have a resolution of 1024×768, while the invisible resolution from the projectors 120 can be 1280×960, which can allow for better recognition at the edges of the display.

SUMMARY OF THE INVENTION

The present invention can be implemented in accordance with numerous aspects consistent with the materials presented herein. One aspect of the present invention can include a method for handling software objects within a surface based computing environment. In the method, a software object can be initially passed from an original position shown on a display of a surface based computing device to a passed position shown on the display. Software of the surface based computing device can maintain an association between the software object and a return position, which is a defined position of the display. The return position can be the initial position or any other defined position available to the surface based computing device. A return object event occurrence can be detected. The software object can be automatically passed from a current position (which can be the passed position or a position to which the object was moved after being passed) of the software object to the return position based upon the occurrence. The passing of the software object can be an animated process that shows the software object traveling across the display. In one embodiment, the maintained association between the return position and the software object can be selectively shown, such as showing a virtual bungee cord connecting the software object to the return position.

Another aspect of the present invention can include a surface based computing device that includes software permitting software objects appearing within a display of a surface based computing device to be passed among users positioned about the surface based computing device. The surface based computing device can also include software maintaining linkages between passed software objects and return positions defined for each of the passed software objects. Further software can be configured to automatically return at least one of the passed software objects from a current position on the display to an associated return position responsive to an occurrence of a return object event relating to that passed software object.

Still another aspect of the present invention can include a virtual bungee for a surface based computing environment. The virtual bungee can include an association between a software object appearing within a display of surface based computing environment and a return position. The return position can be a position of the display other than a current position of the software object. Upon an occurrence of a return object event, the software object can be automatically moved from the current position to the return position.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
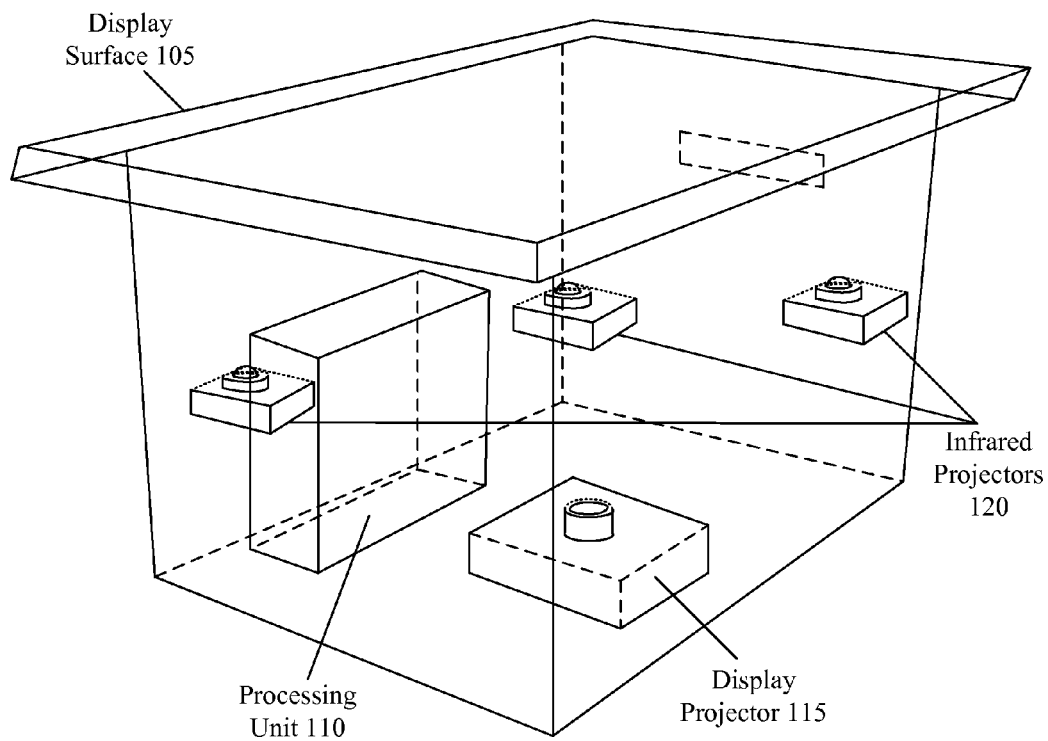
FIG. 1 (Prior Art) shows a surface based computing device.
Figure 2:
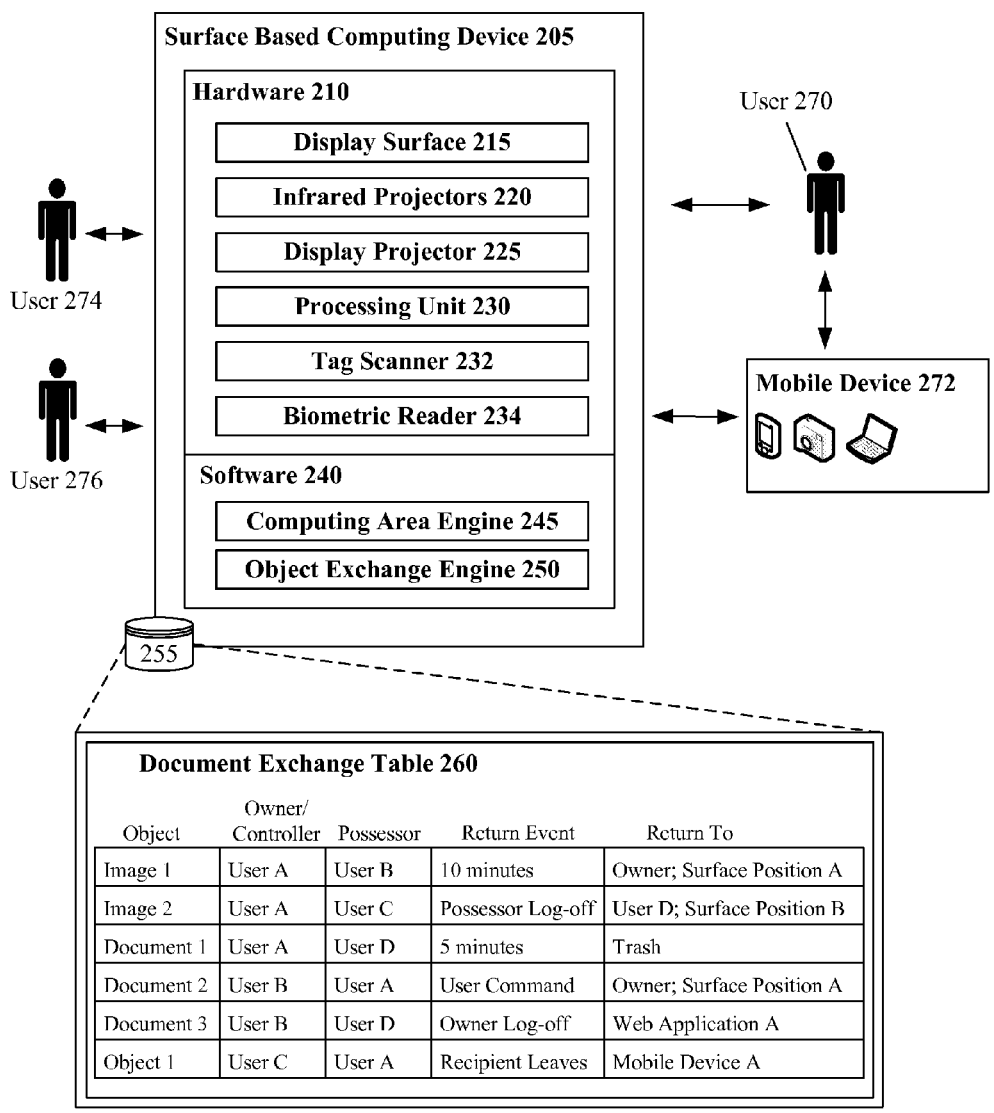
FIG. 2 is a schematic diagram of a system for returning passed objects in a surface based computing environment in accordance with an embodiment of the inventive arrangements disclosed herein.

FIG. 2 is a schematic diagram of a system 200 for returning passed objects in a surface based computing environment in accordance with an embodiment of the inventive arrangements disclosed herein. A passed object can refer to a software object presented upon the display surface 215, which is able to be "passed" along the surface 215 between users 270, 274, 276. Object exchange engine 250 can control details for passing objects. One specific attribute/ability of a passed object can be a return capability, which refers to an ability to establish settings against specific passed objects for responding to an object return event. Returning an object does not necessarily reflect that an object is returned to an origination point although an origination point can be a default return point. Instead a return point can be any configurable location, which includes a definable position of the display surface 215 as well as a definable external device, such as device 272. When a return point is an external device, it can be "anchored" to a pointer to that device, which can be pictorially represented upon the surface 215, such as through an icon or other graphic.

In a simple scenario, an object owner can issue a command to the surface based computing device 205, which initiates an object return event. An occurrence of any definable condition can initiate an object return event, which is not limited to user issued commands. For example, table 260 shows that object return events can include an expiration of a defined duration, an occurrence of an owner logging off or leaving the device 205 area, a possessor logging off or leaving the device 205 area, and the like. An owner, also referred to as a controller, can be a user 270, 274, 276 having authority to control handling of a software object.

In one embodiment, an object owner or other authorized user 270, 274, 276 can specify a set of conditions that are to trigger an object return event. These conditions can be established on an object specific basis. For example, a user/owner can establish a condition that returns an object to the owner ten minutes after it has been conveyed to a different user. The owner can also specify that any attempt to copy the software object is to immediately revoke possession privileges and that an object return event is to be immediately triggered. Further, it is possible to link an audit trail to a returnable software object to log a possession history and/or a modification history, which is available to the owner upon the object's return.

Many different configurable actions can be specified, such as in table 260, that indicate operations that are to be performed when an object return event occurs. These actions can, for example, cause a passed object to move from a current position of the display surface 215 to a defined return point, which can be a position of the display surface 215. The actions can also cause an object to move from one application of the surface based computing device 205 to another. For example, Document 1 can be initially instantiated within a word processing application of a User D and an object return event can cause Document 1 to be removed from the word processing application and placed as an item in a trash application. This type of action can be useful if an owner wants a user to be able to view/use a software object for a limited duration. Return actions are not limited to moving objects to from locally executing applications, but can apply to Web applications as well, as shown in table 260 for Document 3.

Additionally return actions can cause a software object to move from one computing device to another. For example, Object 1 can be moved from the surface based computing device 205 to a Mobile Device A (device 272) when an object return event occurs. In another embodiment, the surface based computing device 205 can include one or more discrete private user areas, and the return event can permit the software object to move among these areas. A concept of private user areas is one implementation for establishing user specific areas of the device 205, which is elaborated upon in U.S. patent application Ser. No. 11/875,216 entitled "Dividing a Surface of a Surface-Based Computing Device Into Private, User-Specific Areas" and filed Oct. 19, 2007, details of which are hereby incorporated by reference.

Although not shown, table 260 can be expanded to permit returnable software objects to be conveyed in sequence to multiple users 270, 274, 276. For example, a user 270 who owns a software object and to whom the object is to be returned can specify an object is to be first passed to user 274, then to user 276 once user 274 is finished with it. A number of users to whom a software object is able to be sequentially passed is arbitrary and can vary from implementation to implementation so long as a return point is established and so long as the object is conveyed to the return point upon an occurrence of an object return event.

In one embodiment, the document exchange engine 250 can utilize a software construct to express that passed objects are able to be returned. One such software construct can be referred to as a virtual bungee, which can be conceptually connected to a software object at one end and to a return point at an opposite end. In one embodiment, a representation of the virtual bungee can be displayable within surface 215. When a virtual bungee is displayed and a return point is linked to a specific application or an external device 272, a graphical representation of that application/device can be shown as an end point of the displayed virtual bungee.

Further, in one embodiment, the passing of software objects can be an animated process, where objects are shown as traveling from one location to another upon the display surface. When a virtual bungee is shown as being connected to a passed objects, the virtual bungee can also be animated to move as the object moves in a characteristic fashion. For instance, a displayed representation of a virtual bungee can expand/contract as an associated software objects moves further, closer to a return position. Animation of a virtual bungee is optional. Different analogs for the "virtual bungee" are to be considered within scope of the present invention, which is not to be limited to a bungee analogy. For example, the virtual bungee can be expressed as a string, as a return address on a mail icon, as an animated animal (e.g., a retriever) able to carry software objects from a current position to the return position, and the like. Different users 270, 274, 276 can be associated with different visual analogs or with user distinct visual analogs through which an object owner or controller can be identified.

Additionally, different visual characteristics of a virtual bungee can be used to visually express properties relating to the virtual bungees. In one embodiment, a virtual bungee can flash a fixed period of time before a return action related to the virtual bungee occurs to warn users that an object associated with the bungee is about to be passed to a return point. For instance, the virtual bungee can flash five seconds before a linked object is returned. In another embodiment, virtual bungees can be used in a collaboration context, where different colors can signify whether a user has modified a software object linked to the bungee. Multiple colors can be used to indicate that multiple different users have modified a software object linked to the bungee since it was last conveyed from an origination point.

The surface based computing device 205 can include hardware 210 and software 240. Hardware 210 can include the necessary components to create the functionality of a surface based computing device 205, such as a display surface 215, infrared projectors 220, display projector 225, processing unit 230, tag scanner 232, biometric reader 234, and/or other components. The surface based computing device 205 can interact with users 270, 274, 276. User 270 can interact with software objects that are locally stored, or stored within one or more external devices, such as mobile device 272. On means for interacting with device 205 is through gestures, which include any user 270, 274, 276 made motion that is detectable by device 205 and which represents an input signifying a command interpretable by device 205.

The display surface 215 can be used with infrared projectors 220 to detect movements and objects placed upon the surface 215. Such movement and object detection can be used to detect gestures on display surface 215. The display projectors 225 can product visible images upon the display surface 215. The processing unit 230 can execute programmatic instructions and can manage the other components 215, 220, 225, 232-234 of the device 205. Tag scanner 232 can read information from detection tags (not shown), which is one means for determining a presence and identity of users 270, 274, 276. The biometric reader 234 can capture a user characteristic (e.g., picture, finger print, iris scan, voice, etc.) that is processed to determine a user's identity. Biometric reader 234 and tag scanner 232 are not required to perform the functionality for using gestures to return passed objects on a surface based computing device 205, but can be implemented in some embodiments to allow the detection of proximate users to the surface based computing device 205.

Software 240 can include programmatic instructions executable by hardware 210 that permits the device 205 to function. One optional software component of system 200 is a computing area engine 245. Engine can be the software component for allowing the division of display surface 215 into separate user areas with independent computing sessions, which are referable as private user areas. Software objects can be passed among these private user areas, and returned objects can cross boundaries of user private areas. Generally, a user private area will be proximately located to an associated user 270, 274, 276. From an implementation standpoint, when private user areas are associated with distinct virtual machines, passing a software object among these virtual machines can be conducted in a fashion similar to passing a software object from surface based computing device 205 to a remotely located device, such as device 272.

Mobile device 272 can be any mobile device in which can interact with a surface based computing device 205. User 270 can interact with documents stored on mobile device 272 and share and retrieve these documents with other users 274, 276 using gestures. Mobile device 272 can implement any of many technologies to allow the communication with surface based computing device 205. For example, mobile device 272 can implement BLUETOOTH, infrared a WIFI transceiver, a USB port, an IEEE1397 port, or the like. Mobile device 272 can be any device including, but not limited to, a mobile phone, a laptop, a digital camera, a personal data assistant (PDA), a game system, or the like.

As used herein, data store 255 can be physically implemented within any type of hardware including, but not limited to, a magnetic disk, an optical disk, a semiconductor memory, a digitally encoded plastic memory, a holographic memory, or any other recording medium. Data store 255 can be stand-alone storage units as well as a storage unit formed from a plurality of physical devices, which may be remotely located from one another. Additionally, information can be stored within the data store 255 in a variety of manners. For example, information can be stored within a database structure or can be stored within one or more files of a file storage system, where each file may or may not be indexed for information searching purposes.

Figure 3:
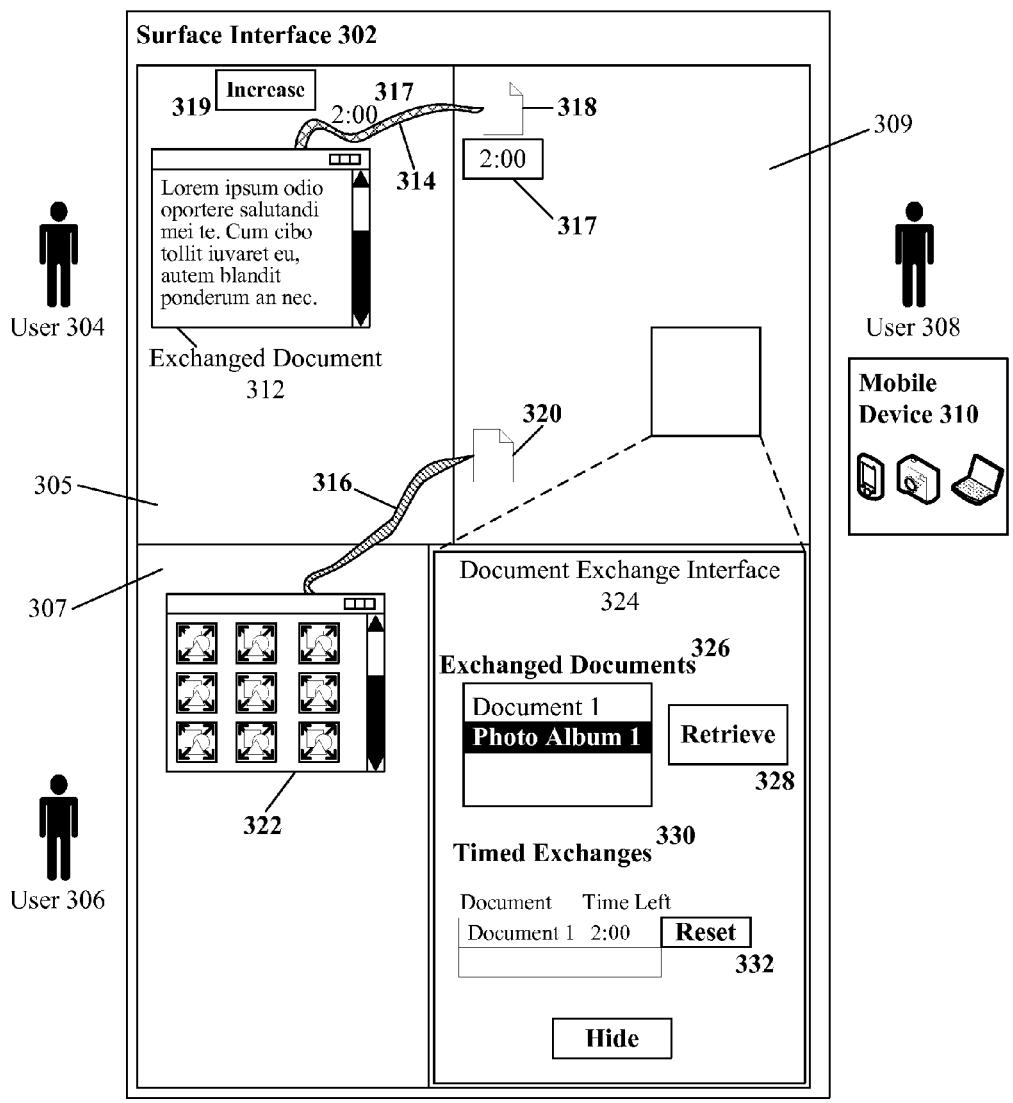
FIG. 3 is a schematic diagram of a system that illustrates a sample user interface for using gestures to return shared documents on a surface based computing device in accordance with an embodiment of the inventive arrangements disclosed herein.

FIG. 3 is a schematic diagram of a system 300 that illustrates a sample user interface for using gestures to return shared documents on a surface based computing device in accordance with an embodiment of the inventive arrangements disclosed herein. Surface interface 302 can be implemented on a surface based computing system in context of the surface based computing device 205 of system 200. In system 300, users 304, 306, 308 can interact with surface interface 302. Surface interface 302 can be broken up into separate user areas, which contain independent computing sessions or private user areas. User area 305 can be a private user area associated with user 304. User area 307 can be a private user area associated with user 306. User area 309 can be a private user area associated with user 308. User 308 can access documents stored on their mobile device 310 using surface interface 302. User 308's user area 309 can include a document exchange interface 324 and document icons 318 and 320.

Each document icon 318, 320 can be associated with a virtual bungee. As shown in system 300, the passable objects are each an electronic document, but the invention is not so limited and passable objects can be any software object able to be displayed and/or represented upon interface 302. Document icon 318 can be linked to exchanged document 312 via bungee 314. Exchanged document 312 can be a document that has been exchanged from user area 309 to user area 305 via a gesture.

Exchanged document 312 can be exchanged using a configurable time limited exchange. Remaining time displays 317 can be GUI indicator of the time remaining on the document exchange. Time displays 317 can be configurable to hide by default or to be shown. If time displays 317 are configured to not be shown, a GUI option such as a button or menu option can be used to enable the display of time displays 317. Button 319 can be a GUI control to allow user 304, the recipient of exchanged document 312 to request for more time with the exchanged document. In the event that a recipient requests for more time, a GUI option such as a dialog can present the owner of the document with the option to allow or deny the request for more time.

Document icon 320 can be linked to exchanged document 322 via bungee 316. Exchanged document 322 can be a document that has been exchanged from user area 309 to user area 307 via a gesture. The virtual bungees 314, 316 can also be used as visual indicators for the correspondence between users interacting with the surface based computing device. The document exchange interface 324 can be an optional interface allowing for finer-tuned control over documents shared with other user areas. Document exchange interface 324 can be hidden by default and activated by any GUI option such as a button or menu option.

Virtual bungees 314 and 316 can be GUI controls that can connect passed objects back to their owners or to a return position. Each virtual bungee 314, 316 can be color-coded. In one example, each virtual bungee 314, 316 can be color-coded according to the owner that has shared the document. In another example, each virtual bungee 314, 316 can be color-coded according to the recipient (or current possessor) of the passed object. In yet another example, each virtual bungee 314, 316 can be color-coded according to the owner-recipient pair. That is, every document shared between two users, regardless of the roles in the owner and recipient relationship, will be colored the same. Different color codes can also indicate whether an associated object has been modified since it was passed from an origination point or to indicate any definable collaboration characteristic.

Virtual bungees 314 and 316 can serve as visual indicators of users working together on a surface based computing device across their independent user areas. Virtual bungees 314, 316 can be used to terminate a document sharing session using a gesture. For example, the owner of a document can use a "pull" gesture by pressing on the virtual bungee 314, 316 then pulling back towards the owner's user area. This gesture can be configured to terminate the document exchange sharing session for the document and return the document to the configured place.

Document exchange interface 324 can illustrate a sample interface for finer-tuned controls of document exchanges. The present invention is not limited to the interface options shown. In the shown example, document exchange interface 324 can include exchanged documents 326, retrieve button 328, and timed exchanges 330. Exchanged documents 326 can be a list of the currently exchanged documents, allowing a user to select one and use the associated retrieve button 328. Retrieve button 328 can terminate the selected exchanged document session in exchanged documents 326. Timed exchanges 330 can be a list of time limited open exchanged documents, allowing for finer control of timed exchanges. Reset button 332 can be associated with a listed timed document exchange. Reset button 332 can reset the time remaining of the selected document exchange.

Exchanged documents 312 and 322 can be any document that can be manipulated or viewed on a surface interface 302. Exchanged documents 312 and 322 can be stored on the surface based computing device in which surface interface 302 is implemented or on an external device such as mobile device 310. These documents 312, 322 can be "flung" into other user areas to be exchanged using gestures. Documents 312, 322 can be any type of document or collection of documents, including, but not limited to, text documents, images, video, audio, photo albums, compressed archives, or the like. Documents 312, 322 represent only one type of passable objects with the virtual bungees 314, 316 can be used.

Figure 4:
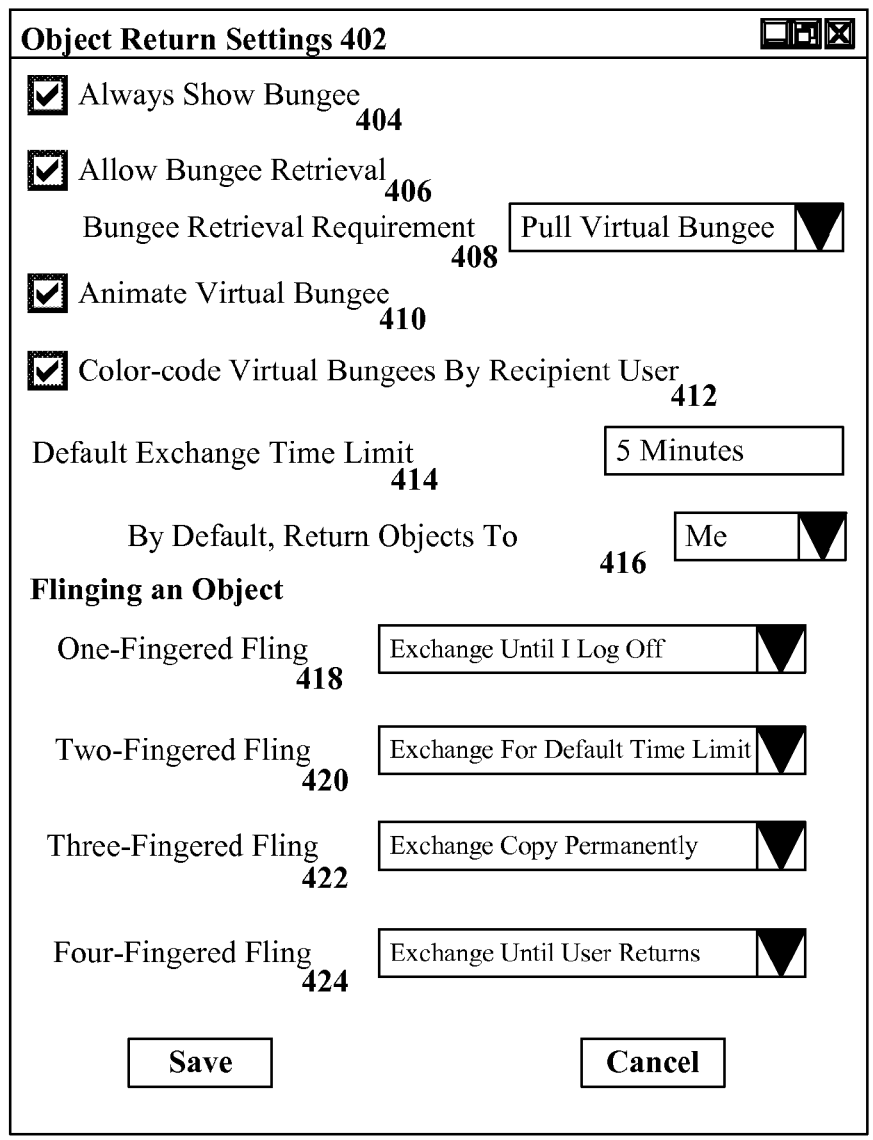
FIG. 4 is a system that illustrates a sample user interface for configuring parameters for returning capabilities associated with passed objects in accordance with an embodiment of the inventive arrangements disclosed herein.

FIG. 4 is a system 400 that illustrates a sample user interface for configuring parameters for returning capabilities associated with passed objects in accordance with an embodiment of the inventive arrangements disclosed herein. Object return settings interface 402 can contain many configurable options 404-424, which are intended to be illustrate.

Option 404 can be an option in which can be enabled or disabled to make the virtual bungee always shown when an object is exchanged. If option 404 is disabled, the virtual bungee can default to be hidden and only be shown when triggered by a GUI option such as a button or menu option. Option 406 can be an option which can be enabled or disabled to allow retrieval of an associated object by its virtual bungee. If option 406 is disabled, the virtual bungee can still be displayed, but retrieval using this bungee can be disallowed. Option 408 can be associated with option 406 and option 408 can specify what is required to retrieve an object using its virtual bungee. Option 408 can be set to any configurable option including, but not limited to, pull virtual bungee, double tap, single tap, or the like. These configurable options can configure the gesture required to retrieve an object by its virtual bungee.

Option 410 can be an option in which can be enabled or disabled to toggle the active state of virtual bungee animations. The virtual bungee can be animated in any way. For example, the virtual bungee can have an animation for when it extends, or when it's pulled back and the object is retrieved. Such animations can be processor intensive and affect the performance of a machine, so option 410 can allow for the toggling of the animation. Option 412 can be an option in which can be enabled or disabled to toggle the color-coding of virtual bungees. If option 412 is enabled, each virtual bungee can be color-coded to match the recipient of the objects.

Option 414 can be an option to specify a default time limit when exchanging a time limited object. Option 414 can be adjusted for any length of time and can be used when quickly created a new time limited object and when it would be timely to prompt the user for the desired time length. Option 416 can be an option to specify the person to return exchanged documents to by default. Such configuration options can include the owner, another user, the trash, a web application, or the like. Positions upon a display of a surface based computer can also be specified.

Options 418-424 can allow configuration of default object exchange types when initiated by certain gestures. For example, option 418 can specify the type of object exchange when a "One-fingered fling" gesture is used. This gesture type can occur when a user presses a document and "flings" it using only one finger. Options 420, 422, and 424 can allow the specification of default object exchange types using other gesture types, such as a "Two-fingered fling," "Three-fingered fling," and "Four-fingered fling" respectively. These gestures can occur when using the associated number of fingers to press on an object and fling it.

Such default object exchange types are shown and can include, but are not limited to, exchange until log-off, exchange for default time limit, exchange copy permanently, and exchange until user returns. Exchange until log-off can allow a object exchange until the owner logs off of their computing session. This can trigger the termination of the object exchange and the object can be returned to the configured target. Exchange for default time limit can be a object exchange which is time limited and this exchange type can use the default time limit for quick exchanging. Exchange copy permanently can be an exchange type that gives the target user a copy of the object that they can keep permanently and the object does not require being returned. In some embodiments, the object that is exchanged could be virtualized into the recipient's workspace and not copied. In others, the objects that are exchanged can be copied, but erased from the recipient's workspace when the object is returned. The exchange copy permanently option can override the implemented solution and allow the recipient to have a permanent copy of the object. The exchange until user returns exchange type can allow the exchange of the object until the recipient explicitly returns the object. This option can allow a user to work on the object until their work is completed.

Although these options are shown in the configuration interface 402, the disclosed invention is not limited to these options. The disclosed invention can be configured to any arbitrary level of configuration. The configuration options can include some, none, or all of the options shown in configuration interface 402.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for handling software objects within a surface based computing environment comprising:
   presenting a plurality of different visual objects upon a surface based computing device that is a single interactive computing device comprising hardware and software that is concurrently utilized by a plurality of different users positioned about the surface based computing device, each of the different users directly interacting with the surface based computing device to effectuate changes;
   passing the visual objects among the different users by moving the visual objects on a surface of the surface based computing device responsive to user interactions of any of the different users with the surface based computing device, wherein each passing of one of the visual objects alters a current position of the visual object on the surface of the surface based computing device but which does not alter a return point;
   within software executing upon the surface based computing device maintaining an association between each of the visual objects displayed upon the surface based computing device at a current position and a return point, wherein for each of the visual objects, a data store of the surface based computing device indexes the object against an owner of the corresponding visual object, a possessor of the corresponding visual object, and the return point of the corresponding visual object, wherein the possessor and the owner recorded for the visual objects are one of the different users positioned about the surface based computing device;
   detecting an occurrence of a return object event for one of the visual objects; and
   automatically passing the visual object associated with the return object event from the current position to the return point associated with that visual object based upon the occurrence of the return object event, wherein the surface based computing device indexes at least a portion of the visual objects against a return event, wherein different types of return events are recorded in the data store of the surface based computing device for different ones of the visual objects, wherein the different types of return events associated with the visual objects comprise a duration based return event triggered when the duration expires, a return event triggered when possessor or owner of the visual object logs off from the surface based computing device, and a return event triggered by a possessor or owner of the visual object leaving a proximity necessary for directly interacting with the surface based computing device, wherein the return point represents a storage location external to the surface based computing device, and wherein the passing of one of the visual objects automatically removes the visual object from a user accessible storage location of the surface based computing device.

2. The method of claim 1, wherein for at least a portion of the visual objects, the possessor is a first one of the different users and wherein a corresponding owner of the visual object is a second one of the different users.

3. The method of claim 1, wherein the surface based computing device indexes at least a portion of the visual objects against a return event specific to that visual object, wherein at least a portion of the return events comprise a time value, and wherein the return point is an original position of the corresponding visual object, and wherein the return object event results from an expiration of a configurable duration, which is the time value indexed against that object within the return event, for which the corresponding visual object is permitted to remain in the current position.

4. The method of claim 1, wherein the passing step is an animated step, which show the software object traveling within a display of the surface based computing device between the current position and the return point.

5. The method of claim 1, further comprising:
   showing a visual link upon a display of the surface based computing device between the return point and the software object when located at the current position.

6. The method of claim 5, further comprising:
   providing an interface option to hide the visual link.

7. The method of claim 5, wherein said visual link is color coded to indicate a collaboration characteristic associated with the visual object.

8. The method of claim 1, further comprising:
   receiving a user entered command from at least one of the owner and the possessor wherein said user entered command initiates the return object event.

9. The method of claim 1, wherein the automatic passing of the visual object to the return point automatically changes the indexed possessor of the visual object from one of the different users to another of the different users.

10. The method of claim 1, further comprising:
    showing a visual link upon a display of the surface based computing device between the return point and the visual object when located at the current position; and
    a defined time before the expiration, visually indicating by altering a presentation characteristic of the visual link that the established duration is about to expire.

11. The method of claim 1, further comprising:
monitoring a geographic position of the different users indicated as owners and possessors of the visual objects relative to a geographic position of the surface based computing device;
automatically detecting one of the different users that is an owner or possessor of one of the visual objects leaving an area proximate to the surface based computing device where an area proximate refers to an area necessary for directly interacting with the surface based computing device, wherein the return object event is initiated upon the detection.

12. A surface based computing device comprising computer hardware and software, said surface based computing device comprising:
software stored on at least one non-transitory storage medium that when executed by hardware presents a plurality of different visual objects upon a surface based computing device that is a single interactive computing device comprising hardware and software that is concurrently utilized by a plurality of different users positioned about the surface based computing device, each of the different users directly interacting with the surface based computing device to effectuate changes;
software stored on at least one non-transitory storage medium that when executed by hardware passes the visual objects among the different users by moving the visual objects on a surface of the surface based computing device responsive to user interactions of any of the different users with the surface based computing device, wherein each passing of one of the visual objects alters a current position of the visual object on the surface of the surface based computing device but which does not alter a return point;
software stored on at least one non-transitory storage medium that when executed by hardware maintains an association between each of the visual objects displayed upon the surface based computing device at a current position and a return point, wherein for each of the visual objects, a data store of the surface based computing device indexes the object against an owner of the corresponding visual object, a possessor of the corresponding visual object, and the return point of the corresponding visual object, wherein the possessor and the owner recorded for the visual objects are one of the different users positioned about the surface based computing device;
software stored on at least one non-transitory storage medium that when executed by hardware detects an occurrence of a return object event for one of the visual objects; and
software stored on at least one non-transitory storage medium that when executed by hardware automatically passes the visual object associated with the return object event from the current position to the return point associated with that visual object based upon the occurrence of the return object event, wherein the surface based computing device indexes at least a portion of the visual objects against a return event, wherein different types of return events are recorded in the data store of the surface based computing device for different ones of the visual objects, wherein the different types of return events associated with the visual objects comprise a duration based return event triggered when the duration expires, a return event triggered when possessor or owner of the visual object logs off from the surface based computing device, and a return event triggered by a possessor or owner of the visual object leaving a proximity necessary for directly interacting with the surface based computing device, wherein the return point represents a storage location external to the surface based computing device, and wherein the passing of one of the visual objects automatically removes the visual object from a user accessible storage location of the surface based computing device.

13. The surface based computing device of claim 12, wherein the software that maintains the linkages is configured to visually present a representation of the linkages upon the display to show which return points correspond to which passed software objects, wherein an option is provided to hide the representation of the linkages, and wherein the passing of the software objects is an animated process that shows the software objects traveling across the display, and wherein when shown, the linkages are animated to show cords expanding and contracting, wherein said cords are attached between the passed software objects and the corresponding return points.

14. The surface based computing device of claim 12, wherein the surface based computing device is a single interactive computing device comprising hardware and software that is operable to present the plurality of software objects upon the surface based computing device that is concurrently utilized by the users positioned about the surface based computing device, said surface based computing device comprising:
a data store comprising digitally encoded records, one per each of the software objects, wherein the records of the software objects indexes the objects against an owner of the corresponding software object, a possessor of the corresponding software object, the return point of the corresponding software object, and a return event, wherein the possessor and the owner recorded for the software are one of the users positioned about the surface based computing device, wherein different types of return events are recorded in the data store for different ones of the software objects, wherein the different types of return events associated with the software objects comprise the duration based return event triggered when the duration expires, the return event triggered when the possessor or owner of the software object logs off from the surface based computing device, and the return event triggered by a possessor or owner of the software object leaving a proximity necessary for directly interacting with the surface based computing device of the surface based computing device.

15. A computer program product comprising:
one or more computer-readable, tangible non-transitory storage devices;
program instructions, stored on at least one of the one or more storage devices, to present a plurality of different visual objects upon a surface based computing device that is a single interactive computing device comprising hardware and software that is concurrently utilized by a plurality of different users positioned about the surface based computing device, each of the different users directly interacting with the surface based computing device to effectuate changes;
program instructions, stored on at least one of the one or more storage devices, to pass the visual objects among the different users by moving the visual objects on a surface of the surface based computing device responsive to user interactions of any of the different users with the surface based computing device, wherein each passing of one of the visual objects alters a current position of the visual object on the surface of the surface based computing device but which does not alter a return point;

program instructions, stored on at least one of the one or more storage devices, to maintain an association between each of the visual objects displayed upon the surface based computing device at a current position and a return point, wherein for each of the visual objects, a data store of the surface based computing device indexes the object against an owner of the corresponding visual object, a possessor of the corresponding visual object, and the return point of the corresponding visual object, wherein the possessor and the owner recorded for the visual objects are one of the different users positioned about the surface based computing device;

program instructions, stored on at least one of the one or more storage devices, to detect an occurrence of a return object event for one of the visual objects; and program instructions, stored on at least one of the one or more storage devices, to automatically pass the visual object associated with the return object event from the current position to the return point associated with that visual object based upon the occurrence of the return object event, wherein the surface based computing device indexes at least a portion of the visual objects against a return event, wherein different types of return events are recorded in the data store of the surface based computing device for different ones of the visual objects, wherein the different types of return events associated with the visual objects comprise a duration based return event triggered when the duration expires, a return event triggered when possessor or owner of the visual object logs off from the surface based computing device, and a return event triggered by a possessor or owner of the visual object leaving a proximity necessary for directly interacting with the surface based computing device, wherein the return point represents a storage location external to the surface based computing device, and wherein the passing of one of the visual objects automatically removes the visual object from a user accessible storage location of the surface based computing device.

16. The computer program product of claim 15, wherein for at least a portion of the visual objects, the possessor is a first one of the different users and wherein a corresponding owner of the visual object is a second one of the different users.

17. The computer program product of claim 15, wherein the surface based computing device indexes at least a portion of the visual objects against a return event specific to that visual object, wherein at least a portion of the return events comprise a time value, and wherein the return point is an original position of the corresponding visual object, and wherein the return object event results from an expiration of a configurable duration, which is the time value indexed against that object within the return event, for which the corresponding visual object is permitted to remain in the current position.

* * * * *